United States Patent
Byrd et al.

(10) Patent No.: US 7,906,215 B2
(45) Date of Patent: Mar. 15, 2011

(54) COMPOSITION AND METHOD FOR CORROSION PROTECTION OF A STRUCTURE

(75) Inventors: Norman R. Byrd, Villa Park, CA (US); Douglas G. Soden, San Pedro, CA (US)

(73) Assignee: The Boeing Company, Chicago, IL (US)

( * ) Notice: Subject to any disclaimer, the term of this patent is extended or adjusted under 35 U.S.C. 154(b) by 364 days.

(21) Appl. No.: 12/105,031

(22) Filed: Apr. 17, 2008

(65) Prior Publication Data

US 2009/0263664 A1 Oct. 22, 2009

(51) Int. Cl.
*B32B 9/04* (2006.01)

(52) U.S. Cl. .......................................... 428/447

(58) Field of Classification Search .................... 428/447
See application file for complete search history.

(56) References Cited

U.S. PATENT DOCUMENTS

| | | | |
|---|---|---|---|
| 4,154,724 A | 5/1979 | Schulze | |
| 6,664,359 B1 * | 12/2003 | Kangas et al. | 528/38 |
| 6,797,795 B2 | 9/2004 | Byrd | |
| 6,809,169 B2 | 10/2004 | Byrd et al. | |
| 7,202,321 B2 | 4/2007 | Bryd et al. | |

FOREIGN PATENT DOCUMENTS

| | | |
|---|---|---|
| CN | 101265319 A | 9/2008 |
| EP | 0380236 A2 | 8/1990 |
| EP | 1593699 A1 | 11/2005 |
| WO | 97/42246 A1 | 11/1997 |
| WO | 03/014194 A1 | 2/2003 |

* cited by examiner

*Primary Examiner* — Margaret G Moore

(57) ABSTRACT

A method and composition for corrosion protection of a structure is provided. In one disclosed embodiment, a polysiloxane ureide which inhibits corrosion formation on a surface of a physical object is provided. The polysiloxane ureide has a backbone including, (i) at least one diamine-terminated polysiloxane as disclosed; (ii) at least one aromatic diamine; and, (iii) at least one diisocyanate. In another disclosed embodiment, there is provided a polyureide which inhibits corrosion formation on a surface of a physical object. The polyureide comprises: (i) at least one aliphatic diamine; (ii) at least one aromatic diamine; and, (iii) at least one diisocyanate.

11 Claims, 2 Drawing Sheets

COMPOSITION AND METHOD FOR CORROSION PROTECTION OF A STRUCTURE

BACKGROUND OF THE DISCLOSURE

1) Field of the Disclosure

The disclosure relates to polymeric coatings which enhance corrosion protection of substrate surfaces. The disclosure also relates to compositions and methods of making polyureide compounds that provide a durable, long-lasting, anti-corrosion coating when applied to substrate surfaces.

2) Description of Related Art

The structural bonding of metal to metal and/or composite type assemblies widely used in aircraft, spacecraft, rotorcraft, trucks, automobiles, boats, ships, bridges, power lines, and various other structures typically require a resultant structure which is reasonably resistant to the extremes of atmospheric conditions found in use. Bonded metal to metal and composite type assemblies must preferably be able to withstand the environmental conditions to be encountered. Of particular importance is resistance to corrosion of such structures. Corrosion of metallic and/or composite substrate surfaces on aircraft, spacecraft, rotorcraft, trucks, automobiles, boats, ships, bridges, power lines, and various other structures having metallic or composite surfaces, can result in increased maintenance to the structure and increased costs to repair and/or replace corroded structures. In addition, even a small amount of corrosion upon the surface of aircraft wings can significantly increase drag and dramatically reduce lift. Thus, corrosion resistance of substrate structures is extremely critical. With regard to metals, corrosion is the spontaneous destructive oxidation of metals. It is a natural process that attempts to reduce the binding energy in metals with the end result being that a corroded metal is oxidized, i.e., electrons leave the bulk metal and it changes its chemical properties. In some instances, the oxidized form of the metal is inherently corrosion-resistant but only to further oxidation. It is not corrosion-resistant to corrosive conditions, such as acidic species or galvanic corrosion. There are many kinds of corrosion which can attack metals, and it would be desirable to have a universal treatment process that can encompass and minimize corrosion on numerous types of metals rather than having multiple processes for each different metal. For aircraft, spacecraft, rotorcraft, trucks, automobiles, boats, ships, bridges, power lines, and various other structures having metallic surfaces, it is desirable to have a corrosion-resistant coating that is impervious to water and that minimizes the transfer of dissolved ionic species to the substrate.

Known methods and compositions exist for enhancing corrosion protection of substrate surfaces. Such known methods and compositions include the use of protective coatings and/or the use of sacrificial species. For sacrificial protection, the use of hexavalent and/or trivalent chromium ions is typically employed. For example, when a metal, such as aluminum, is processed for use in various applications, it may be anodized (treated to form a protective oxide) and simultaneously treated with a hexavalent chromium solution, such as strontium chromate, which deposits onto the aluminum and is sacrificially removed during exposure to corrosion-inducing salts or acids. A further protecting process is to paint the aluminum. The use of hexavalent and/or trivalent chromium in such known methods and compositions can involve additional time and expense.

Additional known methods and compositions used to mitigate corrosion formation on substrate surfaces include the use of adhesives bonded to the substrate surfaces. However, the use of such adhesives may require increased maintenance if the adhesives loosen at the interface between the polymeric adhesive and the substrate surface. In addition, zinc salts and alloys and titanium salts and alloys have been used but they either do not have a long life or require specific materials of construction to be used and are therefore not applicable to many substrates, such as aluminum, copper, composites, and others.

In addition, known methods and compositions using polyureide compounds in coatings applied to substrate surfaces exist. For example, U.S. Pat. No. 4,154,724 discloses polyether polyureides useful in the manufacture of plastics, sealants, molds, foams, and coatings. However, no corrosion protection of substrate surfaces is disclosed. In addition, U.S. Pat. No. 6,797,795 discloses the use of polysiloxane (amide-ureide) compositions and methods to inhibit formation of ice on the surface of a substrate. However, no corrosion protection of substrate surfaces is disclosed.

Accordingly, there is a need for a composition and method for corrosion protection of a substrate surface that provides advantages over known compositions and methods for corrosion protection of a substrate surface.

SUMMARY OF THE DISCLOSURE

This need for a composition and method for corrosion protection of a substrate surface that has advantages over known compositions and methods, as well as a unique, non-obvious, and advantageous composition and method, is satisfied. None of the known compositions and methods provide all of the numerous advantages discussed herein. Unlike known compositions and methods, an embodiment of the composition and method for corrosion protection of a substrate surface, such as a metal surface, may provide one or more of the following advantages: the disclosed embodiments enhance corrosion protection of substrate surfaces, such as metallic surfaces, without the need for hexavalent and trivalent chromium ions; the disclosed embodiments use a hydrophobic polymer with a high polyureide composition that minimizes water adsorption and weakens hydrogen bonding of water to prevent corrosive elements from attacking metallic surfaces; the disclosed embodiments use an easily applied organic coating that results in good corrosion protection and that retains its functionality under a variety of environmental conditions, such as those typically encountered by a commercial or military aircraft, spacecraft, rotorcraft, watercraft, or vehicle; the disclosed embodiments may be used in commercial and aerospace applications worldwide, including with aircraft, spacecraft, rotorcraft, trucks, automobiles, boats, ships, bridges, power lines, and various other structures having substrate surfaces; the disclosed embodiments provide a polyureide coating with improved durability over extended periods of time while exposed to a variety of environmental conditions; and the disclosed embodiments provide an environmentally safe, efficient, and cost saving composition and method.

In an embodiment of the disclosure, there is provided a polysiloxane ureide which inhibits corrosion formation on a surface of a physical object. The polysiloxane ureide has a backbone including:

(i) at least one diamine-terminated polysiloxane of the general formula:

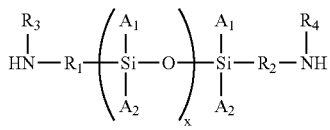

wherein, for each unit of the polysiloxane $R_1$ and $R_2$ are independently selected from the group consisting of $C_1$ to $C_{10}$ alkyls, aryls, and polyaryls; for each unit of the polysiloxane $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles; for each unit of the polysiloxane $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; for each unit of the polysiloxane, x is a number from 1 to 1000; (ii) at least one aromatic diamine; and, (iii) at least one diisocyanate.

In another embodiment of the disclosure, there is provided a polyureide which inhibits corrosion formation on a surface of a physical object. The polyureide comprises: (i) at least one aliphatic diamine; (ii) at least one aromatic diamine and, (iii) at least one diisocyanate.

Another embodiment of the disclosure provides for a method of producing a polysiloxane ureide comprising: reacting at least one diamine-terminated polysiloxane, at least one aromatic diamine; at least one diisocyanate; and at least one amine functional trialkoxy-silane.

Another embodiment of the disclosure provides for a method of producing a polyureide comprising: reacting at least one long chain aliphatic diamine, at least one long chain aromatic diamine, and, at least one diisocyanate.

Another embodiment of the disclosure provides for a method of providing corrosion protection to a structure comprising the steps of: (a) forming the structure; (b) coating one or more surfaces of the structure with a polysiloxane ureide coating, wherein the polysiloxane ureide includes a backbone comprising the following:
(i) at least one diamine-terminated polysiloxane of the general formula:

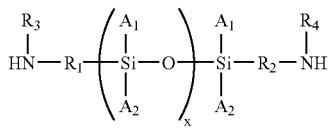

wherein, for each unit of the polysiloxane $R_1$ and $R_2$ are independently selected from the group consisting of $C_1$ to $C_{10}$ alkyls, aryls, and polyaryls; for each unit of the polysiloxane $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles; for each unit of the polysiloxane $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; for each unit of the polysiloxane, x is a number from 1 to 1000; (ii) at least one an aromatic diamine; and, (iii) at least one diisocyanate; and, (c) exposing the coated surface to conditions favorable to the formation of corrosion upon the surface of the structure.

Another embodiment of the disclosure provides for a method of providing corrosion protection to a structure comprising the steps of: (a) forming the structure; (b) coating one or more surfaces of the structure with a polysiloxane ureide coating, wherein the polysiloxane ureide includes a backbone comprising the following:
(i) at least one diamine-terminated polysiloxane of the general formula:

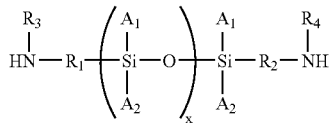

wherein, for each unit of the polysiloxane $R_1$ and $R_2$ are independently selected from the group consisting of $C_1$ to $C_{10}$ alkyls, aryls, and polyaryls; for each unit of the polysiloxane $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles; for each unit of the polysiloxane $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; for each unit of the polysiloxane, x is a number from 1 to 1000; (ii) at least one aromatic diamine; and, (iii) at least one diisocyanate; and, (c) curing the polysiloxane ureide coating for an effective period of time; and, (d) applying a pigmented solution coating to the cured polysiloxane ureide coating.

Another embodiment of the disclosure provides for a method of providing corrosion protection to a structure comprising the steps of: (a) forming the structure; (b) coating one or more surfaces of the structure with a polysiloxane ureide coating, wherein the polysiloxane ureide includes a backbone comprising the following:
(i) at least one diamine-terminated polysiloxane of the general formula:

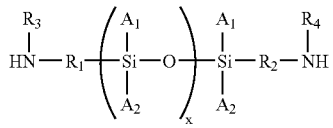

wherein, for each unit of the polysiloxane $R_1$ and $R_2$ are independently selected from the group consisting of $C_1$ to $C_{10}$ alkyls, aryls, and polyaryls; for each unit of the polysiloxane $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles; for each unit of the polysiloxane $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; for each unit of the polysiloxane, x is a number from 1 to 1000; (ii) at least one aromatic diamine; and, (iii) at least one diisocyanate; and, (c) curing the polysiloxane ureide coating for an effective period of time; (d) applying a primer solution coating to the cured polysiloxane ureide coating; (e) curing the primer solution coating for an effective period of time; and, (i) applying a pigmented solution coating to the cured primer coating.

BRIEF DESCRIPTION OF THE DRAWINGS

The foregoing and other advantages and features, and the manner in which the same are accomplished, will become readily apparent upon consideration of the following detailed description taken in conjunction with the accompanying drawings which illustrate preferred and exemplary embodiments, but which are not necessarily drawn to scale, wherein.

DETAILED DESCRIPTION OF THE DISCLOSURE

Disclosed embodiments will now be described more fully hereinafter with reference to the accompanying drawings, in which some, but not all disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The composition and method of the disclosed embodiments may be used in commercial and aerospace applications worldwide, including with aircraft, spacecraft, rotorcraft, trucks, automobiles, boats, ships, bridges, power lines, and various other structures having substrate surfaces, such as metallic surfaces. Accordingly, one of ordinary skill in the art will recognize and appreciate that the inventive composition and method can be used in any number of applications involving substrate surfaces. As an example, but not in a limiting manner, the disclosed embodiments will be introduced, defined and explained with reference to aircraft surfaces, including commercial and military aircraft surfaces.

Figure 1:
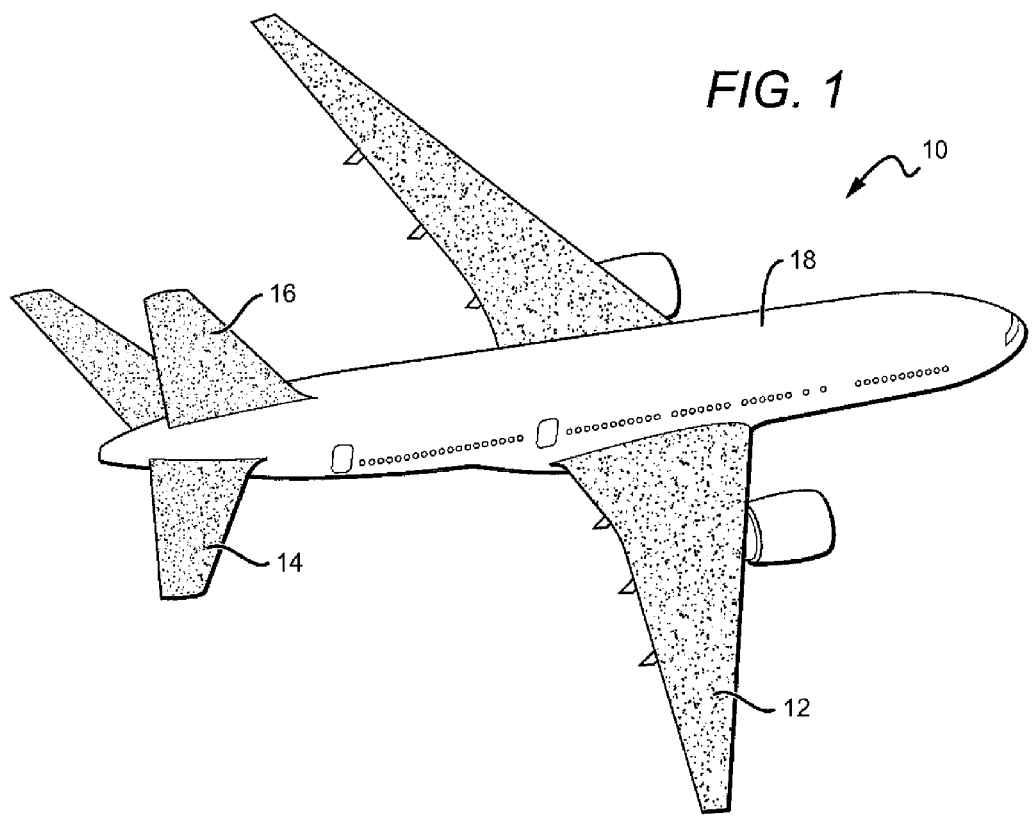
FIG. 1 is a perspective view of a commercial airplane in which the shaded areas are surfaces coated with a corrosion protection composition in accordance with an embodiment of the disclosure.

Referring now to the drawings, FIG. 1 is a perspective view of a commercial airplane 10 in which the shaded areas are surfaces coated with the corrosion protection composition in accordance with a disclosed embodiment. Surfaces of the airplane 10 where the corrosion protection composition of the disclosed embodiment may be applied include, but are not limited to, a wing surface 12, a tail portion surface 14, a rudder surface 16, and a fuselage surface 18.

The disclosure provides for compositions and methods for corrosion protection of a structure. The compositions are directed to polyureides, and in particular, polysiloxane ureides and polyureides having aliphatic diamines and aliphatic aromatics. Polyureides, such as polysiloxane (amide-ureide), used for anti-icing coatings, as disclosed in U.S. Pat. No. 6,797,795, have shown excellent hydrophobicity based on the polysiloxane portion of the molecule and the ureide moiety. The ureide portion is used because of its ability to weaken the hydrogen bonding of water molecules. The siloxane portion contributes to the hydrophobicity. Thus, when water is adsorbed, it beads up and readily rolls off. Although the polysiloxane (amide-ureide) is an effective material for anti-icing, due to the large percentage of the polysiloxane moiety relative to the ureide, its physical properties, i.e., rubbery, stickiness, become a controlling factor. In the polysiloxane (amide-ureide), the molar ratio of the polysiloxane to the amide to the ureide is 1.0.0.5:0.5.

Figure 2:
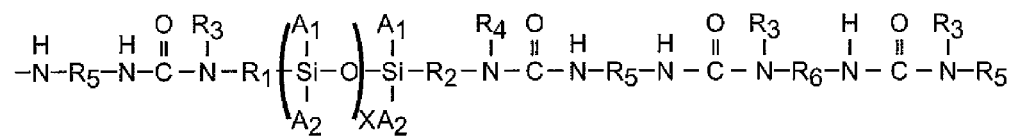
FIG. 2 is a representative formula of a polysiloxane ureide corrosion protection composition in accordance with the disclosure.

In an embodiment of the disclosure, there is provided a novel composition of polysiloxane ureide which inhibits corrosion formation on a surface of a physical object, such as an aircraft, watercraft, rotorcraft, vehicle, or various other objects. FIG. 2 is a representative formula of a polysiloxane ureide corrosion protection composition in accordance with the disclosure. The ureide portion contributes to the anti-corrosion capability by weakening the hydrogen binding of the water and, thereby, decreasing the salt concentration in the water, which in effect, does not allow it to ionize and corrode the metal if the water should get through the coating. Utilizing a hydrophobic polymer with a high polyureide composition minimizes water adsorption and weakens hydrogen bonding of water to prevent corrosive elements from attacking metallic surfaces. Moreover, the polysiloxane ureide composition of the disclosure eliminates the need for hexavalent and trivalent chromium. With the disclosed embodiments, the concentration of ureides is preferably increased, the ratio of ureide to siloxane is preferably increased, and the aromaticity of the ureide is preferably increased, thereby increasing the crystallinity of the molecule and its strength or toughness. In tests conducted on the polysiloxane ureide, the molar ratio of the polysiloxane to the aromatic diamine to the diisocyanate was found to be 0.8:0.2:1.0. Additional ratios of polysiloxane to amino to isocyanate range from 0.05:0.95:1.0 molar to 0.95:0.05:1.0 molar. With the polysiloxane ureide composition of the disclosed embodiment, no dicarboxylic acid or amide group is used, and an additional amine is added, such as an aromatic diamine, including but not limited to, methylene dianiline (MDA), oxydianiline (ODA), and o(ortho)-tolidine, along with different aromatic isocyanates. The polysiloxane ureide composition is preferably in the form of a coating or spray. However, the polysiloxane ureide composition may be in other suitable forms as well. The coating or spray can be easily applied to a substrate surface and results in good corrosion protection. Further, the polysiloxane ureide coating may be coated, as discussed below, with a primer and a pigmented solution such as paint.

The polysiloxane ureide preferably has a backbone including:

(i) at least one diamine-terminated polysiloxane of the general formula:

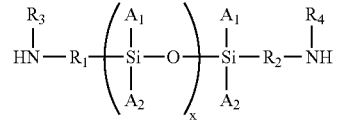

wherein, for each unit of the polysiloxane $R_1$ and $R_2$ are independently selected from the group consisting of $C_1$ to $C_{10}$ alkyls, aryls, and polyaryls; for each unit of the polysiloxane $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles; for each unit of the polysiloxane $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; for each unit of the polysiloxane, x is a number from 1 to 1000; (ii) at least one aromatic diamine; and, (iii) at least one diisocyanate. Polysiloxane ureide coatings which inhibit corrosion formation on a surface of a physical object may be formed from this composition with one or more of the below described groups.

Preferably, the polymer of the polysiloxane ureide is terminated by at least one substituted aryl, alky, or hetero-silane, wherein the substitution comprises an amino, hydroxyl, or mercaptal group. Preferably, the at least one aromatic diamine of the polysiloxane ureide comprises 2,5-diaminobenzotrifluoride, 2,2'-Bis(trifluoromethyl)benzidine, 3,3'-Bis(trifluoromethyl)benzidine, 4,4'-methylene dianiline, 2,2-Bis[4(4-aminophenoxy)phenyl]hexafluoropropane, 2,2-Bis[4 (4-aminophenoxy)phenyl]propane, 4,4'-oxydianiline, 4,4'-diaminodiphenyl sulfide, 4,4'-diaminophenylsulfone, 1,4-Bis(4-aminophenoxy)benzene, 4,4'-Bis(4-aminophenoxy)-biphenyl, 1,3-Bis(4-aminophenoxy)benzene, 1,3-Bis(3-aminophenoxy)benzene, o-tolidine sulfone, 3,3'-5,5'-tetramethylbenzidine, 2,7-Diamino fluorene, 2,4-Diamino-6-(3,5-difluorophenyl)-1,3,5-triazine, 1,3-Bis(4-aminophenoxy) propane, 2,4-Diamino-6-phenyl-1,3,5-triazine, 2,4-Diamino-6 [3-(trifluoromethyl)phenyl]-1,3,5-triazine, 2,6-diamino pyridine, or combinations thereof. However, other suitable aromatic diamines may also be used.

Preferably, the at least one diisocyanate of the polysiloxane ureide comprises 1,4-phenylene diisocyanate, 4,4'-diphenylmethane diisocyanate, cyclohexane-1,4-diisocyanate, butane-1,4-diisocyanate, hexamethylene-1,6-diisocyanate, 1,5-naphthalene diisocyanate, dicyclohexyl-methane-4,4'-diisocyanate, cyclohexylene-1,4-diisocyanate, isophorone diisocyanate, toluene 2,4-diisocyanate, toluene 2,6-diisocyanate, 2,4'-diphenylmethane diisocyanate, 2,2'-diphenylmethane diisocyanate, 4,4'-diisocyanate-diphenylethane-(1, 2), or combinations thereof. However, other suitable diisocyanates may also be used.

Preferably, the polysiloxane ureide comprises a polymer according to the general formula:

(m/n/p)-(x/y)

wherein, m, n, p, x, y are mole fractions; and,
"m" is polysiloxane diamine;
"n" is an aromatic diamine;
"p" is any diamine different from "m" and "n";
"x" is a diisocyanate;
"y" is a diisocyanate, but different from "x";
"m", "n" and "p" each have a value from 0 to 1, such that m+n+p=1; and
"x" and "y" each have a value from 0 to 1, such that x+y=1.

In another embodiment, a random polysiloxane ureide polymer is provided comprising the reaction product of the following:
(i) at least one diamine-terminated polysiloxane of the general formula;

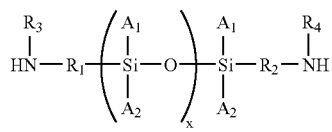

wherein, for each unit of the polysiloxane $R_1$ and $R_2$ are independently selected from the group consisting of $C_1$ to $C_{10}$ alkyls, aryls, and polyaryls; for each unit of the polysiloxane $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles; for each unit of the polysiloxane $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; for each unit of the polysiloxane, x is a number from 1 to 1000; (ii) at least one aromatic diamine; (iii) at least one diisocyanate; and, (iv) at least one amine functional trialkoxy-silane.

In another embodiment of the disclosure, there is provided a polyureide which inhibits corrosion formation on a surface of a physical object. The polyureide comprises: (i) at least one aliphatic diamine; (ii) at least one aromatic diamine; and, (iii) at least one diisocyanate. Preferably, the at least one aliphatic diamine comprises a long chain aliphatic diamine, such as 1,5-Diamino-2-methylpentane, 1,8-Diaminooctane, N,N'-dimethyl-1,6-diaminohexane, 2,2,4-Trimethyl-1-1,6-diaminohexane, N-cyclohexyl-1,3-propanediamine, 3-Aminomethyl-3,3,5-trimethylcyclohexylamine, 2-Butyl-2-ethyl-1,5-pentanediamine, 1,12-Diaminododecane, 1,16-Hexadecyldiamine, 4,4'-methylenebis(2-methylcyclohexylamine), Hexamethylenediamine, N-isopropyl-1,3-propanediamine, N,N'-di-tert-butylethylenediamine, 1,8-Diamino-p-menthane, N,N'dimethyl-1,8-diaminooctane, 1,7-Diaminoheptane, or 1,10-Diaminodecane. However, other suitable long chain aliphatic diamines may also be used.

Preferably, the at least one aromatic diamine of the polyureide comprises a long chain aromatic such as 2,5-diaminobenzotrifluoride, 2,2'-Bis(trifluoromethyl)benzidine, 3,3'-Bis (trifluoromethyl)benzidine, 4,4'-methylene dianiline, 2,2-Bis[4(4-aminophenoxy)phenyl]hexafluoropropane, 2,2-Bis[4 (4-aminophenoxy)phenyl]propane, 4,4'-oxydianiline, 4,4'-diaminodiphenyl sulfide, 4,4'-diaminophenylsulfone, 1,4-Bis(4-aminophenoxy)benzene, 4,4'-Bis (4-aminophenoxy)-biphenyl, 1,3-Bis(4-aminophenoxy)benzene, 1,3-Bis (3-aminophenoxy)benzene, o-tolidine sulfone, 3,3'-5,5'-tetramethylbenzidine, 2,7-Diamino fluorene, 2,4-Diamino-6-(3,5-difluorophenyl)-1,3,5-triazine, 1,3-Bis(4-aminophenoxy)propane, 2,4-Diamino-6-phenyl-1,3,5-triazine, 2,4-Diamino-6 [3-(trifluoromethyl)phenyl]-1,3,5-triazine, 2,6-diamino pyridine, or combinations thereof. However, other suitable long chain aromatic diamines may also be used.

Preferably, the at least one diisocyanate of the polyureide comprises 1,4-phenylene diisocyanate, 4,4'-diphenylmethane diisocyanate, cyclohexane-1,4-diisocyanate, butane-1,4-diisocyanate, hexamethylene-1,6-diisocyanate, 1,5-naphthalene diisocyanate, dicyclohexyl-methane-4,4'-diisocyanate, cyclohexylene-1,4-diisocyanate, isophorone diisocyanate, toluene 2,4-diisocyanate, toluene 2,6-diisocyanate, 2,4'-diphenylmethane diisocyanate, 2,2'-diphenylmethane diisocyanate, 4,4'-diisocyanate-diphenylethane-(1, 2), or combinations thereof. However, other suitable diisocyanates may also be used.

Another embodiment of the disclosure provides for a method of producing a polysiloxane ureide comprising: reacting at least one diamine-terminated polysiloxane, at least one aromatic diamine, at least one diisocyanate, and at least one amine functional trialkoxy-silane. Another embodiment of the disclosure provides for a method of producing a polyureide comprising: reacting at least one long chain aliphatic diamine, at least one long chain aromatic diamine; and at least one diisocyanate.

Another embodiment of the disclosure provides for a substrate resistant to corrosion formation, comprising a substrate having an external surface and a corrosion resistant polymer coating on at least a portion of the external surface, wherein the polymer coating is formed from the polysiloxane ureide as described above. Preferably, the substrate comprises metal, carbon composites, wood, plastics, resin matrices containing graphite, carbon, glass fibers, transparencies, painted and unpainted substrates, or combinations thereof. Another embodiment of the disclosure provides for a substrate resistant to corrosion formation, comprising a substrate having an external surface and a corrosion resistant polymer coating on at least a portion of the external surface, wherein the polymer coating is formed from a polyureide comprising, (i) at least one aliphatic diamine; (ii) at least one aromatic diamine; and, (iii) at least one diisocyanate. Preferably, the substrate comprises metal, carbon composites, wood, plastics, resin matrices containing graphite, carbon, glass fibers, transparencies, painted and unpainted substrates, or combinations thereof.

Another embodiment of the disclosure provides for a method of providing corrosion protection to a structure comprising the steps of: (a) forming the structure; (b) coating one or more surfaces of the structure with a polysiloxane ureide coating, wherein the polysiloxane ureide includes a backbone comprising the following:

(i) at least one diamine-terminated polysiloxane of the general formula:

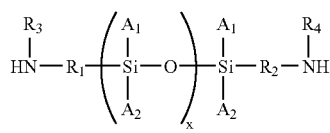

wherein, for each unit of the polysiloxane $R_1$ and $R_2$ are independently selected from the group consisting of $C_1$ to $C_{10}$ alkyls, aryls, and polyaryls; for each unit of the polysiloxane $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles; for each unit of the polysiloxane $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; for each unit of the polysiloxane, x is a number from 1 to 1000; (ii) at least one aromatic diamine; and, (iii) at least one diisocyanate; and, (c) exposing the coated surface to conditions favorable to the formation of corrosion upon the surface of the structure. With this method, the polysiloxane ureide coating may be applied to the surface as a solution of the polymer in tetrahydrofuran (THF)/dimethylacetamide (DMAC) mixture (60%/40%) onto the surface. Alternatively, the polysiloxane ureide may be dissolved in a solvent and the resulting solution can be sprayed onto the surface. Preferably, the surface is made of a material comprising metal, carbon composites, wood, plastics, resin matrices containing graphite, carbon, glass fibers, transparencies, painted or unpainted surfaces, or combinations thereof. Preferably, the surface is one of an aircraft, a spacecraft, a rotorcraft, a truck, an automobile, a boat, a ship, a power line, or a bridge.

Another embodiment of the disclosure provides for a method of providing corrosion protection to a structure comprising the steps of: (a) forming the structure; (b) coating one or more surfaces of the structure with a polysiloxane ureide coating, wherein the polysiloxane ureide includes a backbone comprising the following:

(i) at least one diamine-terminated polysiloxane of the general formula:

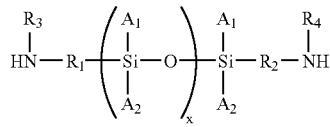

wherein, for each unit of the polysiloxane $R_1$ and $R_2$ are independently selected from the group consisting of $C_1$ to $C_{10}$ alkyls, aryls, and polyaryls; for each unit of the polysiloxane $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles; for each unit of the polysiloxane $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; for each unit of the polysiloxane, x is a number from 1 to 1000; (ii) at least one aromatic diamine; and, (iii) at least one diisocyanate; and, (c) curing the polysiloxane ureide coating for an effective period of time; and, (d) applying a pigmented solution coating to the cured polysiloxane ureide coating. The method may further comprise the step of dissolving the polysiloxane ureide in a solvent and spraying the resulting solution of the polysiloxane ureide onto the surface. Preferably, the surface is made of a material comprising metal, carbon composites, wood, plastics, resin matrices containing graphite, carbon, glass fibers, transparencies, painted or unpainted surfaces, or combinations thereof. Preferably, the surface is one of an aircraft, a spacecraft, a rotorcraft, a truck, an automobile, a boat, a ship, a power line, or a bridge.

Another embodiment of the disclosure provides for a method of providing corrosion protection to a structure comprising the steps of: (a) forming the structure; (b) coating one or more surfaces of the structure with a polysiloxane ureide coating, wherein the polysiloxane ureide includes a backbone comprising the following:

(i) at least one diamine-terminated polysiloxane of the general formula:

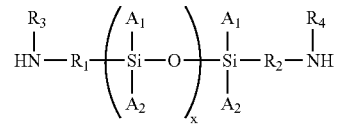

wherein, for each unit of the polysiloxane $R_1$ and $R_2$ are independently selected from the group consisting of $C_1$ to $C_{10}$ alkyls, aryls, and polyaryls; for each unit of the polysiloxane $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles; for each unit of the polysiloxane $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; for each unit of the polysiloxane, x is a number from 1 to 1000; (ii) at least one an aromatic diamine; and, (iii) at least one diisocyanate; and, (c) curing the polysiloxane ureide coating for an effective period of time; (d) applying a primer solution coating to the cured polysiloxane ureide coating; (e) curing the primer solution coating for an effective period of time; and, (f) applying a pigmented solution coating to the cured primer coating. The method may further comprise the step of dissolving the polysiloxane ureide in a solvent and spraying the resulting solution of the polysiloxane ureide onto the surface. Preferably, the surface is made of a material comprising metal, carbon composites, wood, plastics, resin matrices containing graphite, carbon, glass fibers, transparencies, painted or unpainted surfaces, or combinations thereof. Preferably, the surface is one of an aircraft, a spacecraft, a rotorcraft, a truck, an automobile, a boat, a ship, a power line, or a bridge. Preferably, the primer solution coating comprises an epoxy based solution applied before the pigmented solution coating. However, other suitable primer solutions may be used. Preferably, the pigmented solution comprises a paint, such as a water based or oil based paint.

Another embodiment of the disclosure provides for a method of providing corrosion protection to a structure comprising the steps of: (a) forming the structure; (b) coating one or more surfaces of the structure with a polyureide coating, wherein the polyureide comprises: (i) at least one aliphatic diamine; (ii) at least one aromatic diamine; and, (iii) at least one diisocyanate; and, (c) curing the polyureide coating for an effective period of time; and, (d) applying a pigmented solution coating to the cured polyureide coating. The method may further comprise the step of dissolving the polyureide in a solvent and spraying the resulting solution of the polyureide onto the surface. Preferably, the surface is made of a material comprising metal, carbon composites, wood, plastics, resin matrices containing graphite, carbon, glass fibers, transparencies, painted or unpainted surfaces, or combinations thereof. Preferably, the surface is one of an aircraft, a spacecraft, a rotorcraft, a truck, an automobile, a boat, a ship, a power line, or a bridge.

The embodiments of the methods described above are preferably used instead of conventional conversion coatings where the part surface is converted into the coating with a chemical or electro-chemical process. With the disclosed embodiments of the methods, the pigmented solution or paint may be applied directly to the polysiloxane ureide or polyureide coated surface, or the pigmented solution or paint may be applied directly to the primer solution coating which has been initially applied over the polysiloxane ureide or polyureide coated surface. If a pigmented solution or paint is applied, it should preferably be able to withstand corrosive environments and should not peel off.

Although the polysiloxane is used in most of the corrosion-resistant coatings as one of the constituents, the polyureide can also be obtained without the polysiloxane. The benefit of the polysiloxane is its hydrophobicity, but this feature is also available from other hydrocarbons, such as aliphatic diamines and aromatic diamines. The benefit of the ureide is that it decreases the hydrogen bonding ability of water that will minimize the corrosive action of the salts and other acidic species dissolved in the water. With the water hydrogen bond being weakened, the concentration of the corrosive species becomes reduced and less ionic, hence not as liable to attack the metal specimen. Furthermore, enhancing the coplanarity of the polyureide, either with or without the polysiloxane, results in greater chain-to-chain interaction which increases the crystallinity. This, in turn, increases the strength of the coating, thereby minimizing the ability of the coating to be cut or scratched, which further minimizes penetration of the corrosive species to the metal surface. In addition, to further enhance the physical/mechanical properties of the coating, crosslinking of the ureide minimizes penetration of ionic corrosive species. Thus, with increased concentration of aromatic groups (for coplanarity) and crosslinking the coating, enhanced corrosion resistance is obtained. The increased strength and hydrophobicity minimizes the penetration of ionic moieties thereby preventing ionic and electromotive corrosion. Crosslinking of the coating can be attained in many ways. With the use of a polysiloxane as a co-reactant, one or more of the following can be used:

Hydrogen silanes, e.g.,

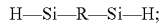

Aminosilanes, e.g.,

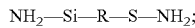

Hydroxysilanes, e.g.,

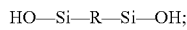

Vinylsilanes, e.g.,

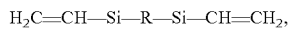

and react these moieties with known reactions of,

reacting with functional moieties such as olefinic groups, anhydrides, or multi-isocyanates.

In addition, the ureides can be crosslinked with formaldehyde by forming methyol derivatives and crosslinking via known processes used in urea/formaldehyde polymerizations. These processes can also be used after the coating has been formed via a post reaction on the coated surface.

Although the earlier mentioned diamines were presented as representative of the type of aromatic diamines that enhance the coplanarity of the polymer, it is recognized that almost any diamine (or polyamine) may also provide the necessary interchain interactions. Some representative compounds that may be used include the following:
2,5-diamineobenzotrifluoride, 2,2'-Bis(trifluoromethyl)benzidine,
3,3'-Bis(trifluoromethyl)benzidine, 4,4'-methylene dianiline,
2,2-Bis[4(4-aminophenoxy)pheyl]hexafluoropropane,
2,2-Bis[4(4-aminophenoxy)phenyl]propane, 4,4'-oxydianiline
4,4'-diaminodiphenyl sulfide, 4,4'-diaminophenylsulfone,
1,4-Bis(4-aminophenoxy)benzene, 4,4'-Bis(4-aminophenoxy)-Biphenyl, 1,3-Bis(4-aminophenoxy)benzene
1,3-Bis(3-aminophenoxy)benzene, o-tolidine sulfone,
3,3'-5,5'-tetramethylbenzidine, 2,7-diamino fluorene
2,4-diamino-6-(3,3-difluorophenyl)-1,3,5-triazine,
1,3-Bis(4-aminophenoxy)propane,
2,4-diamino-6-phenyl-1,3,5-triazine,
2,4-diamino-6[3-(trifluoromethyl)phenyl]-1,3,5-triazine,
isophorone diamine.

In addition to the aromatic diamines, the siliconated diamines are also available for the siloxane ureide structure and some representative examples include 1,3-Bis(4-aminobutyl) tetramethyldisiloxane and 1,3-Bis(3-aminopropyl) tetramethyl disiloxane.

Also, ethylene diamine; propylene diamine, either 1,3 or 1,2; butane diamine, either 1,4 or 1,2; 1,4-cyclohexyl diamine; and piperazine, among others, may also be used.

As with the diamines, the diisocyanate is also capable of contributing to the strength, and some representative diisocyanates that may be used include the following: 1,4-phenylene diisocyanate, 4,4'-diphenylmethane diisocyanate, cyclohexane-1,4-diisocyanate, Butane-1,4-diisocyanate, hexamethylene-1,6-diisocyanate, 1,5-napthalene diisocyanate, Dicyclohexyl-methane-4,4'-diisocyanate, cyclohexylene-1,4-diisocynate, isophorone diisocyanate, 1,4-diisothiocyanotobenzene, and 1,4-butane diisothiocyanate, among others.

Finally, with respect to the ratios of the reactants, and using the polysiloxane (PS) as one of the reactants, the ratio of polysiloxane to diamine to diisocyanate can range from: PS=0.01 mole to diamine=0.99 mole to diisocyanate 1.0 mole; PS 0.99 mole to diamine 0.01 mole to diisocyanate=1.0 mole; and with mixtures of diamine and/or diisocyanate such that, as an example, 0.25 mole of diamine A plus 0.25 mole of diamine B (where diamine A is different from diamine B) can be used with 0.5 mole of PS and one (1.0) mole of diisocynate.

EXAMPLES

Two sets of polymers were prepared; (1) polysiloxane (amide-ureide) with the extra molar quantity of aromatic amine; (2) and a polysiloxane (ureide) with extra aromatic amine and no dicarboxylic acid, hence, no amide group in the molecule.

Example 1

(Polymer 1) Polyamide-Urea Synthesis (Typical)

48.19 g (0.012 m typical) of polysiloxanepropylamine (PS-510) was weighed into a 500 ml round bottom flask and dissolved in 150 ml of methylene chloride ($MeCl_2$). 0.60 g (0.003 m typical) of 4,4'-oxydianaline was weighed into a small beaker and dissolved in 30 ml of $MeCl_2$. This was then added to the PS-510 solution with mixing. The flask was set up with an addition funnel and nitrogen inlet and purged with dry nitrogen for 20 minutes. 1.15 g (0.0075 m typical) of fumaryl dichloride was weighed into a small beaker and dissolved in 30 ml of $MeCl_2$. This was poured into the addition funnel and added drop-wise to the reaction over about 10 minutes. The funnel was rinsed with two 10 ml aliquots of $MeCl_2$. 15 ml of triethylamine was poured into the funnel and also added drop-wise over 10 minutes. The reaction was then allowed to mix for 1 hour. 1.31 g (0.0075 m typical) of 2,4-toluene diisocyanate (TDI) was weighed into a small beaker and dissolved in 30 ml $MeCl_2$. This was poured into the addition funnel and added drop-wise to the reaction over about 10 minutes. The reaction was allowed to mix for 30 minutes then heated to reflux for 1 hour. Work-up was done by extraction with, one volume brine, one volume saturated sodium bicarbonate and one volume deionized water. Solutions were dried with magnesium sulfate and filtered into glass storage containers.

Example 2

(Polymer 2) Poly Urea Synthesis (Typical)

48.19 g (0.012 m typical) of polysiloxanedipropylamine (PS-510) was weighed into a 500 ml round bottom flask and dissolved in 150 ml of tetrahydrofuran (THF). 0.60 g (0.003 m typical) of 4,4'-oxydianiline was weighed into a small beaker and dissolved in 30 ml of THF. This was then added to the PS-510 solution with mixing. The flask was set up with an addition funnel and nitrogen inlet and purged with dry nitrogen for 20 minutes. 2.61 g (0.015 m typical) of 2,4-toluene diisocyanate (TDI) was weighed into a small beaker and dissolved in 30 ml of THF. This was poured into the addition funnel and added drop-wise to the reaction over about 10 minutes. The funnel was rinsed with two 10 ml aliquots of THF. The reaction was allowed to mix for 30 minutes then heated to reflux for 1 hour.

Example 3

(Polymer 3) Polysiloxane ureide (2,6-diaminopyridine/toluene diisocyanate)

48.19 g (0.012 m typical) of polysiloxanedipropylamine (PS-510) was weighed into a 500 ml round bottom flask and dissolved in 150 ml of tetrahydrofuran (THF). 0.38 g (0.003 m typical) of 2,6-diaminopyridine was weighed into a small beaker and dissolved in 30 ml of THF. This was then added to the PS-S10 solution with mixing. The flask was set up with an addition funnel and nitrogen inlet and purged with dry nitrogen for 20 minutes. 2.61 g (0.015 m typical) of toluene diisocyanate (TDI) was weighed into a small beaker and dissolved in 30 ml of THF. This was poured into the addition funnel and added drop-wise to the reaction over about 10 minutes. The funnel was rinsed with two 10 ml aliquots of THF. The reaction was allowed to mix for 30 minutes then heated to reflux for 1 hour.

Example 4

(Polymer 4) Polysiloxane ureide 4,4'-methylenedianiline/toluene diisocyanate)

48.19 g (0.012 m typical) of polysiloxanedipropylamine (PS-510) was weighed into a 500 ml round bottom flask and dissolved in 150 ml of tetrahydrofuran (THF). 0.59 g (0.003 m typical) of 4,4'-methylenedianiline was weighed into a small beaker and dissolved in 30 ml of THF. This was then added to the PS-510 solution with mixing. The flask was set up with an addition funnel and nitrogen inlet and purged with dry nitrogen for 20 minutes. 2.61 g (0.015 m typical) of toluene diisocyanate (TDI) was weighed into a small beaker and dissolved in 30 ml of THF. This was poured into the addition funnel and added drop-wise to the reaction over about 10 minutes. The funnel was rinsed with two 10 ml aliquots of THF. The reaction was allowed to mix for 30 minutes then heated to reflux for 1 hour.

Example 5

(Polymer 5) Polysiloxane ureide (o-tolidine/toluene diisocyanate)

48.19 g (0.012 m typical) of polysiloxanedipropylamine (PS-510) was weighed into a 500 ml round bottom flask and dissolved in 150 ml of tetrahydrofuran (THF). 0.64 g (0.003 m typical) of O-tolidine was weighed into a small beaker and dissolved in 30 ml of THF. This was then added to the PS-510 solution with mixing. The flask was set up with an addition funnel and nitrogen inlet and purged with dry nitrogen for 20 minutes. 2.61 g (0.015 m typical) of toluene diisocyanate (TDI) was weighed into a small beaker and dissolved in 30 ml of THF. This was poured into the addition funnel and added drop-wise to the reaction over about 10 minutes. The funnel was rinsed with two 10 ml aliquots of THF. The reaction was allowed to mix for 30 minutes then heated to reflux for 1 hour.

Example 6

(Polymer 6) Polysiloxane ureide (2,6-diaminopyridine/4,4'-methylenebisphenylisocyanate)

48.19 g (0.012 m typical) of polysiloxanedipropylamine (PS-510) was weighed into a 500 ml round bottom flask and dissolved in 150 ml of tetrahydrofuran (THF). 0.38 g (0.003 m typical) of 2,6-diaminopyridine was weighed into a small beaker and dissolved in 30 ml of THF. This was then added to the PS-510 solution with mixing. The flask was set up with an addition funnel and nitrogen inlet and purged with dry nitrogen for 20 minutes. 3.75 g (0.015 m typical) of 4,4'-methylenebisphenylisocyanate (MDI) was weighed into a small beaker and dissolved in 50 ml of THF. This was poured into the addition funnel and added drop-wise to the reaction over about 10 minutes. The funnel was rinsed with two 10 ml aliquots of THF. The reaction was allowed to mix for 30 minutes then heated to reflux for 1 hour.

Examples 1 through 6 solution samples were transferred to glass storage containers and used "as is" with no further work-up. Subsequent to the polymer preparation, the samples were coated on aluminum plates for corrosion testing: 6"×3" 7075T6 aluminum plates were prepared with alkaline cleaning followed by ti-acid etch. Coating was effected by knifing 10-12% solutions over the aluminum plates with a 0.0015 inch fixed gap doctor blade. The plates were air dried in place before removing from the fixture. Final drying was done at 220 degrees F. for 30 minutes. Testing was done in 96 degrees F. salt fog chamber and the plates were inspected and photographed at 7 (170 hr), 14 (330 hr) and 21 (500 hr) days.

EVALUATION

Figure 3:
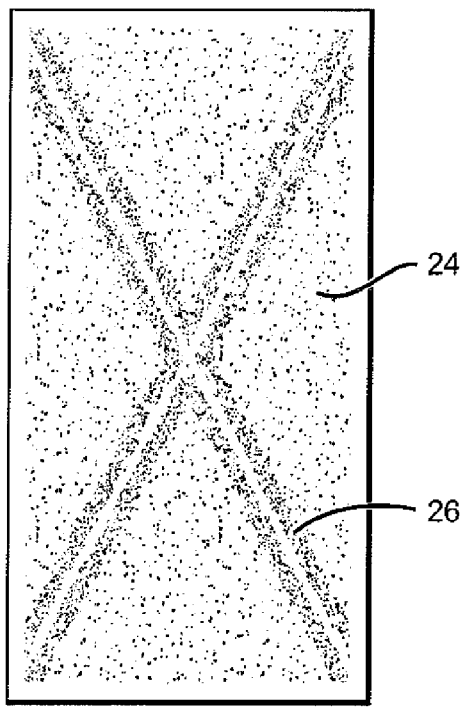
FIG. 3 is a drawing of a test sample from a corrosion study using a polysiloxane (amide-ureide) sample; and, FIG. 4 is a drawing of a test sample from a corrosion study using a polysiloxane ureide corrosion protection composition in accordance with the disclosure.
Figure 4:
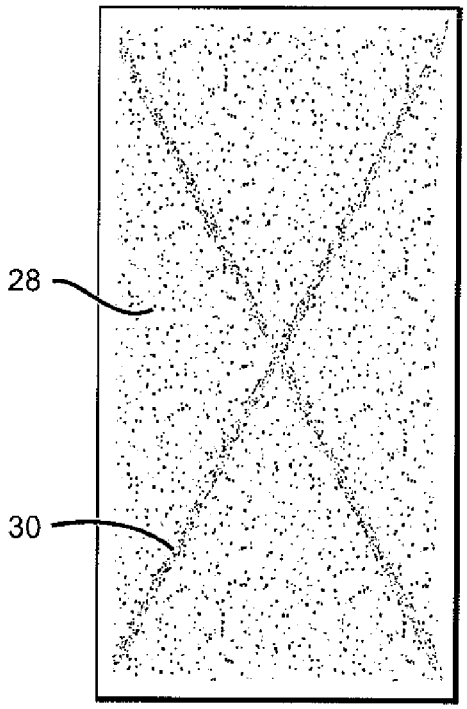

Comparing the 21 day corrosion studies of the amine/ureide sample [PS-510 (0.8 moles) o-tolidine (0.2 moles), fumaryl chloride (0.5 moles), toluene diisocyanate-2,4 (TDI) (0.5 moles) with triethylamine as an acid-acceptor)]. FIG. 3 is a drawing of a test sample 24 from the corrosion study using the polysiloxane (amide-ureide) composition sample. The "X" indicates where a knife was used to cut through the polymer coating during testing. After testing, a dark area 26 exhibited around the "X" as evidence of corrosion and represented salt solution that got underneath the polymer and began corroding the aluminum underneath the coating. The molar ratio for this sample is polyureide [PS-510 (0.8 moles), oxydianiline (ODA) (0.2 moles), TDI (1.0 moles)], and FIG. 4 is a drawing of a test sample 28 from a corrosion study using a polysiloxane ureide corrosion protection composition in accordance with the disclosure. The "X" indicates where a knife was used to cut through the polymer coating during testing. After testing, an area 30 exhibited no evidence of corrosion. FIG. 4 exhibits a greater corrosion resistance of the polyureide versus the polysiloxane (amide/ureide) shown in FIG. 3.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of providing corrosion protection to a structure comprising an aircraft, spacecraft or rotorcraft, the method comprising the steps of:
    (a) forming the structure;
    (b) providing a polysiloxane ureide that includes a reaction product comprising the following:
        (i) at least one diamine-terminated polysiloxane of the general formula:

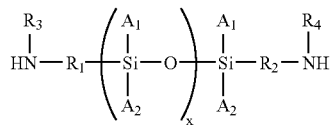

wherein, for each unit of the polysiloxane $R_1$ and $R_2$ are independently selected from the group consisting of $C_1$ to $C_{10}$ alkyls, aryls, and polyaryls; for each unit of the polysiloxane $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles; for each unit of the polysiloxane $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; for each unit of the polysiloxane, x is a number from 1 to 1000;
        (ii) at least one aromatic diamine, and,
        (iii) at least one diisocyanate;

(c) dissolving the polysiloxane ureide in a solvent and spraying a resulting coating solution of the polysiloxane ureide directly onto one or more substrate surfaces of the structure, wherein the coating solution of the polysiloxane ureide is not used as an adhesive; and,
    (d) exposing the coated surface to conditions favorable to the formation of corrosion upon the surface of the structure.

2. The method according to claim 1, wherein the polysiloxane ureide coating is applied to the one or more surfaces as a solution of the polymer in a tetrahydrofuran (THF)/dimethylacetamide (DMAC) mixture (60% volume/40% volume) onto the surface.

3. The method according to claim 1, wherein the coating solution of the polysiloxane ureide provides improved durability over extended periods of time while exposed to a plurality of environmental conditions.

4. The method according to claim 1, wherein the substrate surface is made of a material selected from the group consisting of metal, carbon composites, plastics, resin matrices containing graphite, carbon, glass fibers, transparencies, painted or unpainted substrates, or combinations thereof.

5. The method according to claim 1, wherein a molar ratio of the polysiloxane to the aromatic diamine to the diisocyanate is in a range of from 0.05:0.95:1.0 molar to 0.95:0.05:1.0 molar.

6. A method of providing corrosion protection to a structure comprising an aircraft, spacecraft or rotorcraft, the method comprising the steps of:
    (a) forming the structure;
    (b) providing a polysiloxane ureide that includes a reaction product comprising the following:
        (i) at least one diamine-terminated polysiloxane of the general formula:

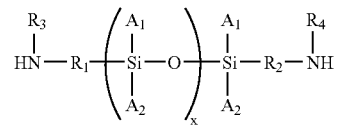

wherein, for each unit of the polysiloxane $R_1$ and $R_2$ are independently selected from the group consisting of $C_1$ to $C_{10}$ alkyls, aryls, and polyaryls; for each unit of the polysiloxane $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles; for each unit of the polysiloxane $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; for each unit of the polysiloxane, x is a number from 1 to 1000;
        (ii) at least one aromatic diamine;
        (iii) at least one diisocyanate; and,
    (c) dissolving the polysiloxane ureide in a solvent and spraying a resulting coating solution of the polysiloxane ureide directly onto one or more substrate surfaces of the structure;
    (d) curing the coating solution of the polysiloxane ureide for an effective period of time; and,
    (e) applying a pigmented solution coating to the cured coating solution of the polysiloxane ureide.

7. The method according to claim 6, wherein the coating solution of the polysiloxane ureide provides improved durability over extended periods of time while exposed to a plurality of environmental conditions.

8. The method according to claim 6, wherein a molar ratio of the polysiloxane to the aromatic diamine to the diisocyanate is in a range of from 0.05:0.95:1.0 molar to 0.95:0.05:1.0 molar.

9. A method of providing corrosion protection to a structure comprising an aircraft, spacecraft or rotorcraft, the method comprising the steps of:
(a) forming the structure;
(b) providing a polysiloxane ureide that includes a reaction product comprising the following:
(i) at least one diamine-terminated polysiloxane of the general formula:

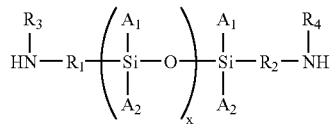

wherein, for each unit of the polysiloxane $R_1$ and $R_2$ are independently selected from the group consisting of $C_1$ to $C_{10}$ alkyls, aryls, and polyaryls; for each unit of the polysiloxane $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles; for each unit of the polysiloxane $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; for each unit of the polysiloxane, x is a number from 1 to 1000;
(ii) at least one aromatic diamine; and,
(iii) at least one diisocyanate,
(c) dissolving the polysiloxane ureide in a solvent and spraying a resulting coating solution of the polysiloxane ureide directly onto one or more substrate surfaces of the structure;
(d) curing the coating solution of the polysiloxane ureide coating for an effective period of time;
(e) applying a primer solution coating to the cured coating solution of the polysiloxane ureide coating;
(f) curing the primer solution coating for an effective period of time; and,
(g) applying a pigmented solution coating to the cured primer coating.

10. The method according to claim 9, wherein the coating solution of the polysiloxane ureide provides improved durability over extended periods of time while exposed to a plurality of environmental conditions.

11. The method according to claim 9, wherein a molar ratio of the polysiloxane to the aromatic diamine to the diisocyanate is in a range of from 0.05:0.95:1.0 molar to 0.95:0.05:1.0 molar.

* * * * *